Oct. 11, 1949.   C. W. COCHRAN   2,484,015
POSITIVE DISPLACEMENT HYDRAULIC TRANSMISSION
Filed March 20, 1945   5 Sheets-Sheet 5

Fig. 5.

INVENTOR.
CHAS. W. COCHRAN.
BY
ATTORNEY.

Patented Oct. 11, 1949

2,484,015

UNITED STATES PATENT OFFICE 2,484,015

POSITIVE DISPLACEMENT HYDRAULIC TRANSMISSION

Charles W. Cochran, United States Navy, Yeadon, Pa.

Application March 20, 1945, Serial No. 583,825
5 Claims. (Cl. 192—61)

(Granted under the act of March 3, 1883, as amended April 30, 1928; 370 O. G. 757)

This invention relates to new and useful improvements in power transmission devices, and more particularly to variable speed transmissions of the hydraulic type.

Known types of hydraulic transmissions or so-called fluid drives existing prior to the present invention do not provide a positive displacement of the fluid power transmitting medium and therefore a substantial amount of slippage occurs between the driving and driven elements of the transmission mechanism with resulting loss of power and reduced efficiency. Existing transmissions of the hydraulic type are characterized also by the lack of any means or mechanism for effectively rendering them "neutral," or for otherwise operatively disengaging the driving and driven elements, with the result that it is necessary to employ a suitable clutch or like mechanism in conjunction with such transmissions. Furthermore, in most conventional fluid transmissions there is a flow of the fluid power transmitting medium through the mechanism at all times, even after the driven member or element is brought up to the speed of the driving element, thereby presenting substantial difficulties and problems in respect to the cooling and erosion of the parts of the transmission that come into contact with the fluid power transmitting medium.

With the foregoing in mind, it is the principle of the present invention to provide a novel variable speed transmission of the hydraulic type which operates to effect a positive displacement of the fluid power transmitting medium therein.

Another object of the present invention is to provide a novel hydraulic transmission of the stated type wherein relative slippage between the driving and driven elements, with consequent reduction of power, is substantially eliminated.

Another object of the invention is to provide a novel hydraulic transmission of the type described wherein the transmission of power between the driving and driven elements may be neutralized thereby eliminating the necessity for employing in conjunction therewith an independent clutch or like device.

Another object of the invention is to provide a novel hydraulic transmission wherein there is a flow of the fluid power transmitting medium only during such periods of operation thereof as the driven element may be rotated at speeds slower than the driving element thereby substantially eliminating all difficulties and problems with respect to the cooling and erosion of the parts of the mechanism coming into contact with the fluid medium.

Another object of the invention is to provide a hydraulic transmission of the stated characteristics which may be operated to provide free wheeling characteristics between the driving and driven elements as desired.

Another object of the present invention is to provide a novel variable speed transmission of the hydraulic type that is operable to assume full load gradually and wherein sudden shock loads upon the mechanical elements thereof are substantially eliminated.

Still another object of the present invention is to provide a hydraulic variable speed transmission of the character set forth that may be used in conjunction with conventional power generators to provide both forward and reverse movement without the meshing or unmeshing of gears.

A further object of the present invention is to provide a hydraulic variable speed transmission having the stated attributes that is provided with means operable to limit the amount of torque transmitted by the driving to the driven members of the device.

A still further object of the invention is to provide a novel hydraulic variable speed transmission having the features and characteristics described that is of comparatively simplified, rugged construction, and highly efficient in operation to drive the driven elements at variable speeds without the use of speed reduction gearing.

These and other objects of the present invention, and the various features and details of the construction and operation thereof, are hereinafter fully set forth and described with reference to the accompanying drawings, in which.

Figure 1:
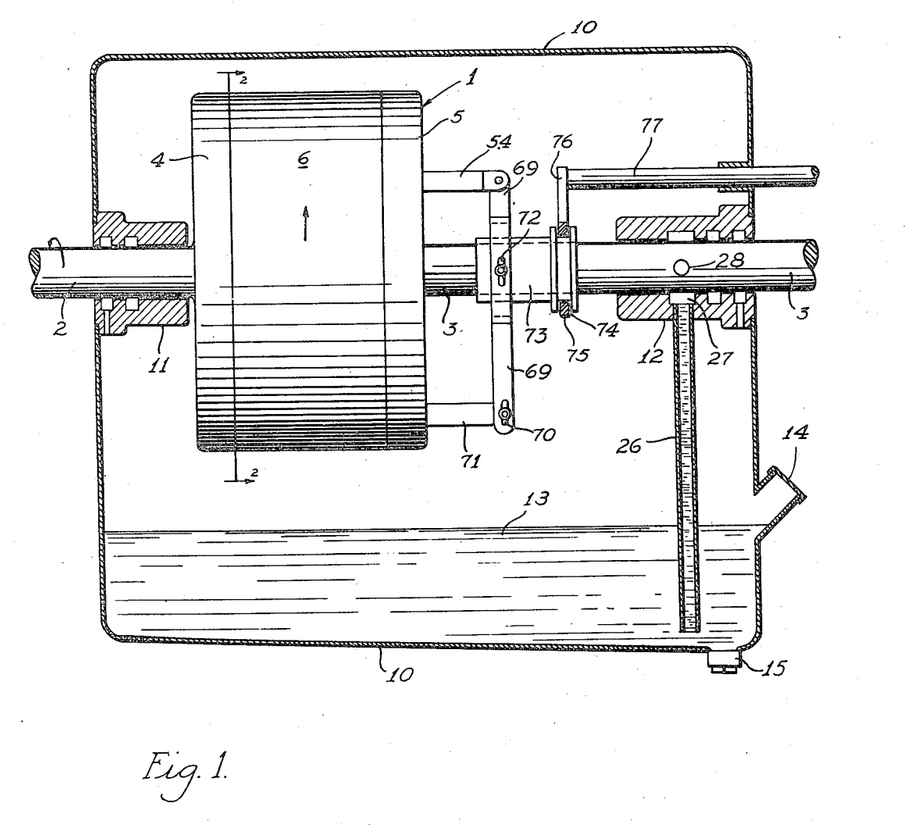
Fig. 1 is a side elevational view of a hydraulic variable speed coupling device embodying the present invention.

Referring now to the drawings, and more particularly to Fig. 1, thereof, a variable speed hydraulic transmission embodying the present invention comprises, generally, a transmission 1 operatively connected between a driving shaft 2 and a driven shaft 3. The transmission 1 comprises end plates 4 and 5 secured to opposite sides of a central housing member 6 by means of bolts 7 that thread into suitably located tapped openings 8 in the housing member 6 (see Fig. 4). The end plate 4 is fixed to, or may be formed as a part of, the driving shaft 2, and the other end plate 5 has the driven shaft 3 journalled in a bearing 9 therein with the result that the end plate 5 and housing member 6, which are secured together and to the end plate 4, rotate with the latter and the driving shaft 2 at the speed of rotation at which said shaft 2 is driven by a suitable power source such as an internal combustion engine, electric motor or the like.

The transmission 1 is mounted within a suitable closed casing structure 10 having end wall portions through which the driving and driven shafts 2 and 3 are rotatably journalled by means of bearing structures 11 and 12, respectively. The casing 10 is arranged to contain a supply of fluid such as, for example, oil 13 to a predetermined depth that is supplied to the transmission 1 in the manner and for the purposes hereinafter set forth. An inlet 14 for the oil is provided in the casing 10, as well as a drain port 15.

Referring now more particularly to Figs. 2, 3, 4 and 5, there is secured to, or formed as a part of, the end of the driven shaft 3, a gear 16 of predetermined diameter having a predetermined number of teeth. The gear 16 extends coaxially within the housing member 6 between the end plates 4 and 5, and has a reduced free end portion that is rotatably journalled in the end plate 4 by means of a bearing 17.

Figure 2:
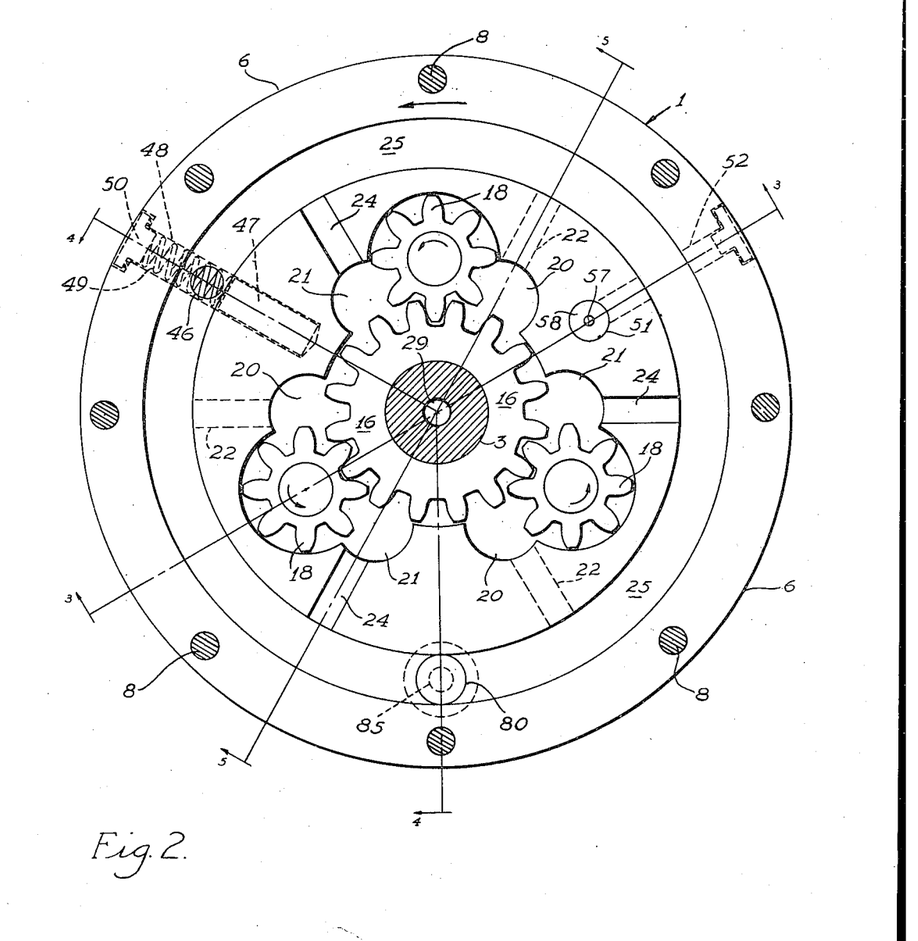
Fig. 2 is a sectional view through the coupling taken on line 2—2, Fig. 1.

Mounted within the housing 6 and meshed with the gear 16 to drive the latter is a plurality of gears 18 (for example, three) that have their opposite ends journalled in the end plates 4 and 5 of the device by means of suitable bearings 19. The gears 18 are of predetermined diameter with respect to the diameter of the gear 16, and have their axes of rotation arranged circumferentially of said gear at equally spaced intervals thereabout.

With reference to Fig. 2 of the drawing, the device 1 is adapted, in the present disclosure, to be driven by the shaft 2 in the direction indicated by the arrows with the result that rotation of the gears 18 about the gear 16 will take place in the indicated direction. Bearing this in mind, there is formed in the housing member 6, at the side of each gear 18 leaving engagement with the gear 16, a low pressure oil chamber 20, and a high pressure oil chamber 21 is similarly formed in said member 6 at the other side of each of said gears 18 and the gear 16. The low pressure oil chambers 20 each communicate radially through a passage or port 22 with a low pressure oil manifold 23 (see also Figs. 4 and 5) of annular configuration that is formed, by machining, or otherwise, in the end face of the member 6 covered by the end plate 5. Similarly, the high pressure oil chambers 21, each communicate radially, through a passage or port 24, with a high pressure oil manifold 25 of annular configuration that is formed in the opposite end face of the member 6 covered by the end plate 4.

Figure 4:
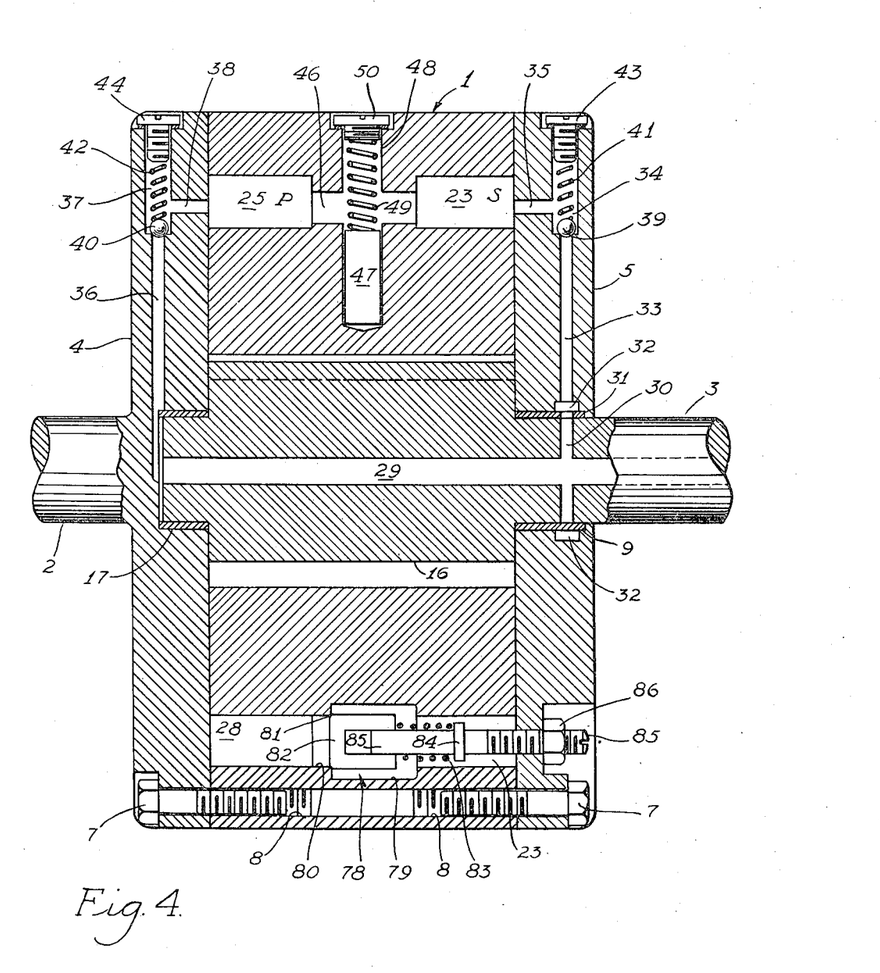
Fig. 4 is a sectional view taken on line 4—4, Fig. 2.
Figure 5:
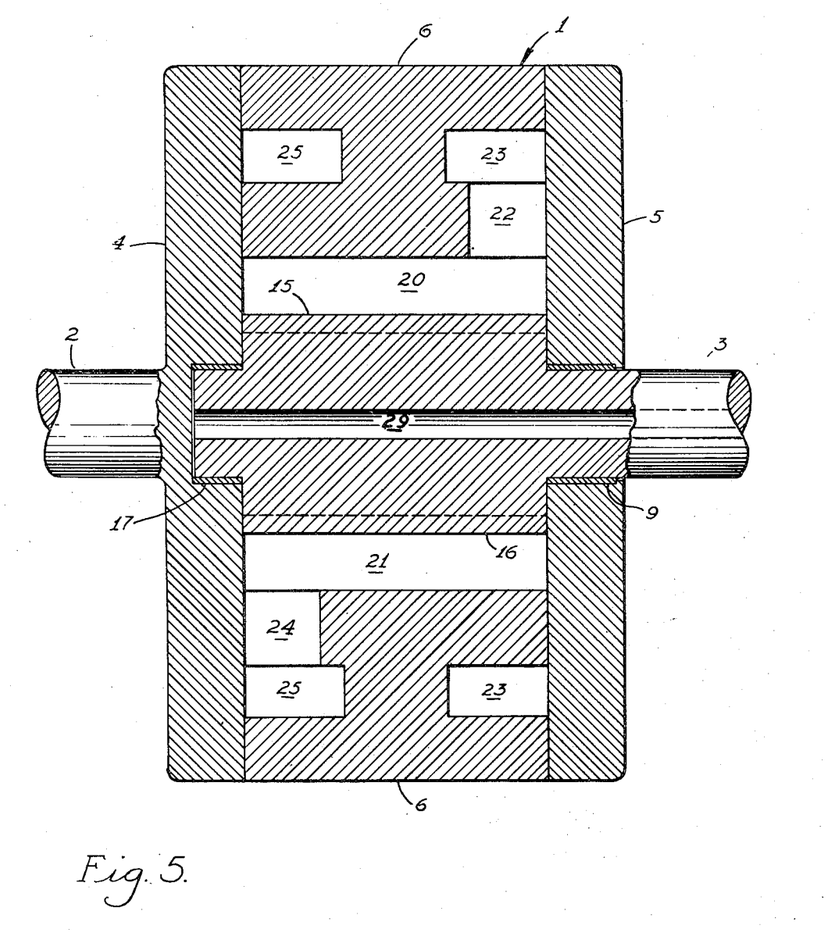
Fig. 5 is a sectional view taken on line 5—5, Fig. 2.

Referring again to Fig. 1 of the drawings, and also to Fig. 4 thereof, the low and high pressure manifolds 23 and 25 and their associated chambers 20 and 21 are supplied with oil from the supply 13 in the casing 10. As hereinafter described, oil from the supply 13 in the casing 10 is caused to flow upwardly through a pipe or tube 26 and into an annular channel 27 in the driven shaft bearing 12 from which it enters the driven shaft 3 through a transverse port 28 therein and then transverses a passage 29 formed coaxially within the driven shaft 3 from said port 28 to the end of said shaft 3 that is journalled in the end plate 4 of the coupling.

As shown in Fig. 4, oil from the passage 29 in shaft 3, enters the low pressure manifold 23 through a radial port 30 provided in said shaft 3 and this port communicates through an opening 31 in the shaft bearing 9, with an annular passage 32 formed in the end plate 5. A passage 33 leads from this passage 32 radially through the end plate 5 to a valve chamber 34 from which a port 35 leads laterally to said low pressure manifold 23. On the other hand, oil passing to the high pressure manifold 25 emerges from the passage 29 in the end face of the driven shaft 2 whence it flows through a passage 36 that leads radially through the end plate 4 to a valve chamber 37 from which a port 38 leads laterally to the said high pressure manifold 25.

The valve chambers 34 and 37 are provided with ball checks 39 and 40, respectively, that are normally held closed against the passages 33 and 36 by means of springs 41 and 42 held in place in said valve chambers 34 and 37 by means of screws or like closures 43 and 44. The construction and arrangement of the check valves 39 and 40 and the compression forces of their springs 41 and 42, respectively, is such that said valves open in response to a predetermined oil pressure in passages 33 and 36 to permit oil to enter the associated manifold, and preclude the flow of oil in the reverse direction from the manifolds back through the check valves to the oil supply in the casing structure 10.

As shown in Fig. 4 of the drawings, intercommunication directly between the high pressure manifold 25 and the low pressure manifold 23 is provided by means of a by-pass port or passage 46 formed in the housing member 6 parallel to the rotational axis thereof, and the flow of oil between the manifolds 25 and 23 through said port 46 is controlled automatically by a valve member 47 that moves radially in a valve chamber 48 against the action of a spring 49 in response to centrifugal force generated by rotation of the transmission imparted thereto by the driving shaft 2 as aforesaid. The valve chamber 48 is closed by means of a screw or like closure 50 and the force of the spring 49 is calibrated to oppose radial movement of the valve member 47 in accordance with the weight of said member and the centrifugal forces to which subjected by rotation of the transmission at the speeds contemplated therefor. When the device is not rotating, the valve member 47 is maintained in its innermost position by the spring 49, and the passage 46 is fully opened to afford free passage between the manifolds 25 and 23 as shown in said Fig. 4.

From the foregoing, it will be observed that with the transmission properly filled with oil, if power is applied to the driving shaft 2 thereby rotationally driving the transmission device 1, the gears 18 will function as pumps to pump oil from the low pressure chambers 20 to the high pressure chambers 21 from which it flows through ports 24 to manifold 25 whence it transverses the passage 46 to the manifold 23 and through passages 22 again to the low pressure chambers 21 for recirculation as described. At the start of rotation of the driving shaft 2 and transmission, the valve 47 is fully open with respect to passage 46 so that there is a relatively free flow of oil between the manifolds 25 and 23 with the result that there is little or no resistance presented to rotation of the gears 18 relative to the gear 16 and said gears 18 will rotate and revolve substantially freely about the gear 16 without driving the latter.

However, as the rotational speed of shaft 2 and the transmission 1 increases with a resulting increase in the centrifugal force acting on the valve 47, the latter is caused to move progressively outward against the force of its spring 49 to gradually close the port 46 interconnecting the manifolds 25 and 23. As the valve 47 gradually closes to reduce the flow area through the port 46, the permissible flow of oil from manifold 25 to manifold 23 is proportionally reduced causing the pressure of the oil pumped into the chambers 21 from the chambers 20 by the gears 18 to increase with the result that increasing opposition is presented to relative rotation of the gears 18 with respect to the gear 16 ultimately causing the latter to rotate with the gears 18. Of course, rotation of the gear 16 and the driven shaft 3 at first will be relatively slow with relation to the speed of the shaft 2, but as the oil pressure in the chambers 21 continues to increase as the valve 47 further closes the port 46, the speed at which the gear 16 and shaft 3 is rotated will increase until the pressure in said chambers 21 becomes sufficiently great as to substantially lock the gears 18 and gear 16 at which time there will be established a substantially direct driving connection therebetween.

In addition to the valve 47, there is provided in the transmission 1, means for selectively controlling the operation thereof as between neutral, free-wheeling, and direct drive, relationships. To this end, and referring to Fig. 3 of the drawings, there is provided entirely through the transmission 1 an open ended passage 51 that is arranged parallel to the rotational axis of the device and positioned therein radially inward of the oil manifolds 25 and 23. Intercommunication is provided between the manifolds 25 and 23 through the central portion of the passage 51 by radial ports or ducts 52 and 53 that communicate respectively, between the manifolds 25 and 23 and said passage 51. These ducts or ports 52 and 53 have their outer ends closed against oil leakage by suitable screw closures or the like.

Figure 3:
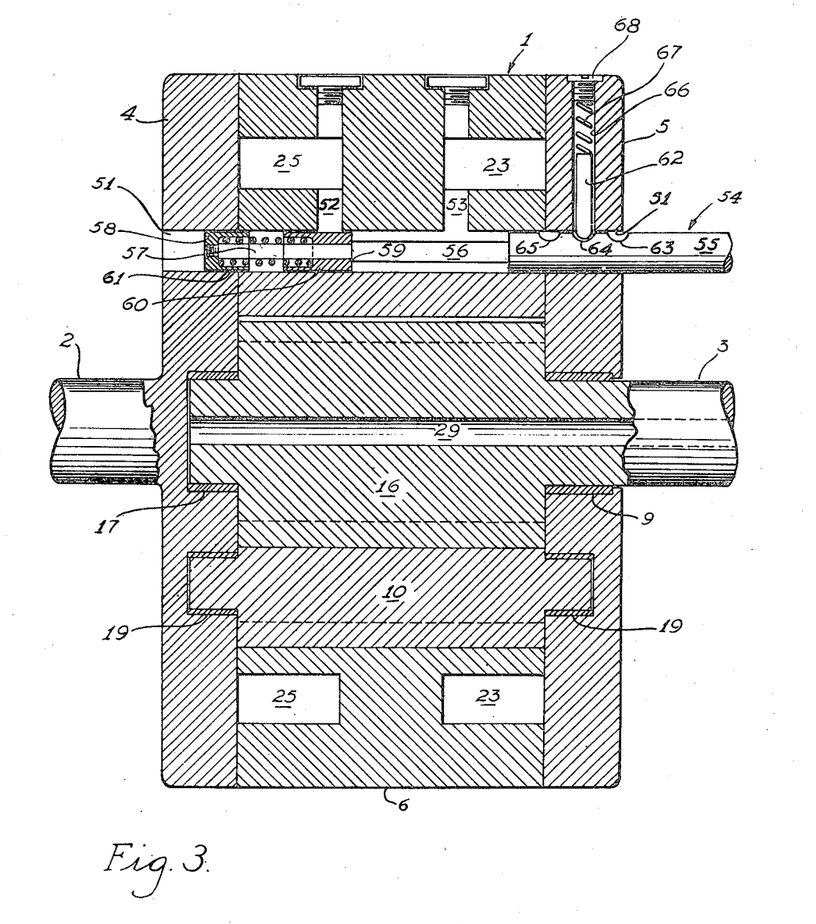
Fig. 3 is a sectional view taken on line 3—3, Fig. 2.

Mounted for sliding movement within the passage 51 is a rod 54 having a portion 55 of a diameter substantially the same as that of the bore of the passage 51, a portion 56 of reduced diameter, and an end portion 57 of still smaller diameter. Secured upon the free end of the reduced portion 57 of rod 54 is a generally cup-shaped member 58 likewise of a diameter substantially the same as that of the passage 51, and slidable upon the end portion 57 of said rod 54 intermediate the stop 58 and the shoulder 59 provided between the reduced rod portions 56 and 57, is a valve member 60 also of a diameter substantially equal to that of the passage 51. A spring 61 is interposed between stop 58 and valve mmeber 60 and the latter normally is held by said spring 61 against the rod shoulder 59 as shown in Fig. 3. It is to be noted, however, that the valve 60 is actuable in response to oil pressure in the passage 51, under certain operating conditions hereinafter described, toward the stop member 58 against the expansion force of the spring 61.

The rod 54 is adapted to be actuated manually between three predetermined positions longitudinally with respect to the passage 51 as determined by engagement of a pin 62 into a selected one of three detents or recesses 63, 64 and 65 provided in the portion 55 of the rod 54, the said pin 62 being slidably mounted in a chamber 66 formed radially in the end plate 5 and normally urged into engagement with said detents by means of a spring 67 secured against displacement from the chamber 66 by means of a screw or like closure 68.

In operation of the selective control means, when the rod 54 is actuated longitudinally of the passage 51 so that the pin 62 is engaged in the detent 63, the valve member 60 will be actuated by the rod shoulder 59 a similar distance to the left, with respect to Fig. 3, to a position substantially unobstructing the duct 52 so that oil is afforded a substantially free passage from the high pressure manifold 25 through passage 51 to the low pressure manifold with the result that, regardless of the operation of the centrifugal valve 47, insufficient oil pressure can be built up in chambers 21 to drive the gear 16 and driven shaft 3, and the transmission may be said to be in "neutral" position.

On the other hand, when the control rod 54 is actuated to engage the pin 62 in detent 64 as shown, thereby positioning the stop 58 and valve member 60 in the relative positions illustrated, it will be observed that the position of said valve member 60 is such that it has closed duct 52 thereby normally preventing the flow of oil from manifold 25 through passage 51 to the manifold 23 with the result that operation of the transmission will take place under the sole control of the centrifugal valve 47 as hereinbefore described so that sufficient oil pressure is built up in the chambers 21 to cause the gear 16 and shaft 3 to be rotationally driven by the gears 18 and the driving shaft 2. However, under certain operating conditions such as, for example, in the case of a motor driven vehicle coasting down hill with no power applied to the driving shaft 2, the driven shaft 3 may be driven by the wheels of the vehicle at a speed faster than that at which the engine driving shaft 2 is rotating, in which event the driven shaft 3 will become the driving shaft and shaft 2 the driven shaft. In such circumstances the operation of the coupling device is reversed and the chambers 20 and manifold 23 become the high pressure side of the hydraulic system of the device and the chambers 21 and manifold 25 become the low pressure side of the system. Accordingly, as the oil pressure builds up in chambers 20 and manifold 23, the oil in passage 51 will attain a pressure sufficient to actuate the valve member 60 to the left with respect to Fig. 3, against its spring 61, thereby opening valve member 60 with respect to the duct 52 to permit oil to by-pass therethrough from the manifold 23 to the manifold 25 irrespective of the operation of the centrifugal valve 47 so that a substantially "free-wheeling" connection is provided between the shafts 3 and 2. This operation will continue until such time as the rotational speed of shaft 2 again exceeds that of the shaft 3 whereupon the operation will be reversed, the chambers 21 and manifold 25 again becoming the high pressure side of the hydraulic system with the valve member 60 closed with respect to the duct 52 so that operation of the coupling continues under the sole control of the centrifugal valve 47 as previously described.

Finally, when the valve control rod 54 is actuated to engage the pin 62 in the detent 65, the stop member 58 will be positioned in the passage 51 so as to preclude actuation of the valve member 60 to the left, by the pressure of the oil in the manifold 23, a sufficient distance to open the duct 52. Accordingly, regardless of the oil pressure in the manifold 23, the valve member 60 cannot be actuated thereby to open the duct 52 to bypass oil therethrough from said manifold 23 to the manifold 25, and the centrifugal valve 47 will operate as hereinbefore stated to control the driving connection between the shafts 2 and 3 regardless of which thereof may, at any particular time, be rotating at a speed greater than the other.

Actuation of the control rod 54 as aforesaid may be accomplished by mechanism of the character shown in Fig. 1 of the drawings, wherein the outer end of said rod 54 is pivotally connected to one end of a lever 69 that has its other end pivotally connected through a slot 70 to a fixed stud 71 on the end plate 5, said lever in turn being pivotally connected intermediate its ends, through a slot 72, to a sleeve 73 that is slidably and rotatably mounted upon the shaft 3. The sleeve 73 is provided at its outer end with an annular channel or groove 74 in which is mounted the ring portion 75 of a member 76 that is carried by a manually shiftable control rod 77 slidably mounted in an end wall of the casing structure 10. It will be observed that axial movement of the rod 75 will effect a corresponding linear movement of the sleeve 73 along shaft 3 thereby pivoting lever 69 about its connection to stud 71 and actuating the control rod 54 longitudinally relative to the passage 51 to engage pin 62 in the appropriate detent 63, 64 or 65.

In addition to control of the operation of the coupling of the present invention afforded by the centrifugal valve 47 and the selectively operable control valve 60, there is provided in the device a relief valve mechanism that is operable automatically to by-pass oil between the manifolds 25 and 23 in the event the coupling is subjected to excessive or shock loads. To this end, and referring more particularly to Fig. 4 of the drawings, there is provided intermediate the manifolds 25 and 23, an intercommunicating passage 78 having portions 79 and 80 of respectively larger and smaller diameter to provide between said passage portions a valve seat 81 against which a valve element 82 is normally urged into closing relation by a spring 83 that operates between the valve 82 and a collar 84 secured upon a valve stem 85. The valve stem 85 slidably engages the valve 82 and extends outwardly of the transmission through the end plate 5 thereof. The outer end of the stem 85 is threaded to receive a nut 86, and it will be observed that by adjustment of said nut 86 the relative position of the stem 85 and its collar 84, longitudinally with respect to the valve 82, may be varied to regulate the force of the spring 83 acting on said valve and thereby selectively adjust the relief valve mechanism to open in response to a predetermined oil pressure in the manifold 25.

As previously stated herein, and referring to Fig. 1 of the drawings, the low and high pressure manifolds 23 and 25, and their associated chambers 20 and 21, are supplied with oil from the reserve 13 in the casing 10 that encloses the transmission mechanism, the said oil passing from the supply 13 upwardly through the pipe or tube 26 and into the transmission mechanism as more particularly hereinbefore described. Supply of the oil from the reserve 13 upwardly through the pipe or tube 26 as aforesaid is effected by means of the pressure differential existing between the high and low pressure sides of the fluid system in the transmission mechanism. Thus, for example, when the transmission is operating as hereinbefore described to drive the driven shaft 3 from the driving shaft 2, a suction force will be created in the low pressure side of the fluid system which will operate to draw oil into the mechanism upwardly through the tube or pipe 26 from the reserve 13. In addition, in the high pressure side of the fluid system of the transmission mechanism, there will exist a certain amount of leakage of the high pressure oil outwardly of the transmission device 1, for example, outwardly of the open ended passage 51 and outwardly past the driven shaft bearing 9, into the enclosing casing structure 10 thereby building up in the casing 10 a pressure head above the surface of the reserve oil supply 13 that is sufficient, in conjunction with the suction or pull provided in the low pressure side of the fluid system, to cause the oil from the reserve supply 13 to feed through the pipe or tube 26 and into the transmission mechanism as needed to maintain the latter filled with oil.

From the foregoing description of the present invention it will be observed that there is provided a novel variable speed hydraulic transmission that operates upon the principle of positive displacement of the fluid power transmitting medium therein thereby minimizing relative slippage with consequent loss of power, between the driving and driven elements of the mechanism. The invention also provides a transmission having the characteristics set forth wherein the transmission of power between the driving and driven elements may be effectively neutralized thereby eliminating the necessity for employing an independent clutch or like device in conjunction therewith. The invention further provides a hydraulic transmission having suitable control mechanism operable to provide free wheeling characteristics between the driving and driven elements as desired, and wherein the flow of the fluid power transmitting medium occurs only during operating periods in which the driven elements may be rotating at speeds slower than the driving elements thereby substantially eliminating the difficulties and problems in respect to the cooling and erosion of the parts of the transmission mechanism coming into contact with the fluid medium. Finally the invention provides a hydraulic variable speed transmission having the structural and operating characteristics described that is of comparatively simplified, rugged construction, and highly efficient in operation.

While a particular embodiment of the invention has been illustrated and described herein, it is not intended to limit the invention to such disclosure, and changes and modifications may be made in and to the device within the scope of the following claims.

The invention described herein may be manufactured and used by or for the Government of the United States of America for governmental purposes without the payment of any royalties thereon or therefor.

I claim:

1. In a variable speed hydraulic transmission having associated therewith a driving shaft and driven shaft, a housing structure rotatable with said driving shaft and having therein separately defined fluid chambers provided with first and second by-passes therebetween, a fluid medium in said chambers, pump elements rotatable respectively with said housing structure and driven shaft normally cooperable to effect a positive displacement of said fluid from one of said chambers to the other proportional to relative rotation of said driving and driven shafts, means associated with said first by-pass operable to regulate the flow of displaced fluid therethrough from said other chamber to said one chamber and thereby control the pressure of the displaced fluid in said other chamber and the relative rotation of said pump elements and the driving and driven shafts, and valve means in said second by-pass selectively actuable into any one of three predetermined positions to control the flow of fluid therethrough; said valve means in one of said positions providing substantially unrestricted flow of fluid through said by-pass between said chambers, in another of said positions precluding fluid flow therethrough, and in the other of said positions being operable in response to fluid pressure in said one chamber greater than in said other chamber to cause fluid flow through said by-pass from one chamber to the other proportional to the fluid pressure difference therebetween.

2. In a variable speed hydraulic transmission having associated therewith a driving shaft and driven shaft, a housing structure rotatable with said driving shaft and having therein separately defined fluid chambers provided with first and second by-passes therebetween, a fluid medium in said chambers, pump elements rotatable respectively with said housing structure and driven shaft normally cooperable to effect positive displacement of said fluid from one of said chambers to the other proportional to relative rotation of said driving and driven shafts, means associated with said first by-pass normally preventing fluid flow therethrough and operable in response to a predetermined pressure in said other chamber to cause passage of fluid through said first by-pass from said other chamber to said one chamber, and valve means in said second by-pass selectively actuable into any one of three predetermined positions to control the flow of fluid therethrough; said valve means in one of said positions providing substantially unrestricted flow of fluid through said by-pass between said chambers, in another of said positions precluding fluid flow therethrough, and in the other of said positions being operable in response to fluid pressure greater than in said other chamber to cause fluid flow through said by-pass from one chamber to the other proportional to the fluid pressure difference therebetween.

3. In a variable speed hydraulic transmission having associated therewith a driving shaft and driven shaft, a housing structure rotatable with said driving shaft and having therein separately defined fluid chambers provided with first, second and third by-passes therebetween, a fluid medium in said chambers, pump elements rotatable respectively with said housing structure and driven shaft normally cooperable to effect displacement of said fluid from one of said chambers to the other proportional to relative rotation of said driving and driven shaft, means associated with said first by-pass operable to regulate the flow of displaced fluid therethrough from said other chamber to said one chamber and thereby control the pressure of the displaced fluid in said other chamber and the relative rotation of said pump elements and the driving and driven shafts, valve means in said second by-pass normally preventing fluid flow therethrough operable in response to a predetermined fluid pressure in said other chambers to cause passage of fluid through said second by-pass from said other chamber to said one chamber, and valve means in said third by-pass selectively actuable into any one of three predetermined positions to control the flow of fluid therethrough; said valve means in one of said positions providing substantially unrestricted flow of fluid through said by-pass between said chambers, in another of said positions precluding fluid flow therethrough, and in the other of said positions being operable in response to fluid pressure in said one chamber greater than in said other chamber to cause fluid flow through said by-pass from one chamber to the other proportional to the fluid pressure difference therebetween.

4. In a variable speed hydraulic transmission having associated therewith a driving shaft and driven shaft, a housing structure rotatable with said driving shaft and having therein separately defined fluid chambers provided with first, second and third by-passes therebetween, a fluid medium in said chambers, pump elements rotatable respectively with said housing structure and driven shaft normally cooperable to effect positive displacement of said fluid from one of said chambers to the other proportional to relative rotation of said driving and driven shafts, means associated with said first by-pass operable automatically in response to the speed of rotation of said housing structure to restrict the flow of displaced fluid therethrough from said other chamber to said one chamber as the rotational speed of the housing structure increases and thereby control the pressure of the displaced fluid in said other chamber and the relative rotation of said pump elements and the driving and driven shafts, valve means in said second by-pass normally preventing fluid flow therethrough operable in response to a predetermined fluid pressure in said other chambers to cause passage of fluid through said second by-pass from said other chamber to said one chamber, means for adjusting said valve means to render the same operable in response to different predetermined fluid pressures, and valve means in said third by-pass selectively actuable into any one of three predetermined positions to control the flow of fluid therethrough; said valve means in one of said positions providing substantially unrestricted flow of fluid through said by-pass between said chambers, in another of said positions precluding fluid flow therethrough, and in the other of said positions being operable in response to fluid pressure in said one chamber greater than in said other chamber to cause fluid flow through said by-pass from one chamber to the other proportional to the fluid pressure difference therebetween.

5. In a variable speed hydraulic transmission having associated therewith a driving shaft and driven shaft, a housing structure rotatable with said driving shaft and having therein separately defined fluid chambers provided with first, second and third by-passes therebetween, a fluid medium in said chambers, pump elements rotatable respectively with said housing structure and driven shaft normally cooperable to effect displacement of said fluid from one of said chambers to the other proportional to relative rotation of said driving and driven shafts, means associated with said first by-pass operable to regulate the flow of displaced fluid therethrough from said other chamber to said one chamber and thereby control the pressure of the displaced fluid in said other chamber and the relative rotation of said pump elements and the driving and driven shafts, valve means in said second by-pass normally preventing fluid flow therethrough operable in response to a predetermined fluid pressure in said other chamber to cause passage of fluid through said second by-pass from said other chamber to said one chamber, valve means in said third by-pass selectively actuable into any one of three predetermined positions to control the flow of fluid therethrough; said valve means in one of said positions providing substantially unrestricted flow of fluid through said by-pass between said chambers, in another of said positions precluding fluid flow therethrough, and in the other of said positions being operable in response to fluid pressure in said one chamber greater than in said other chamber to cause fluid flow through said by-pass from one chamber to the other proportional to the fluid pressure difference therebetween; a substantially fluid tight casing enclosing the transmission, a reserve fluid supply in said casing, and means utilizing the differential between the fluid pressures in said chambers to supply fluid thereto from said reserve as required to maintain said chambers substantially filled with said fluid medium.

CHARLES W. COCHRAN.

REFERENCES CITED

The following references are of record in the file of this patent:

UNITED STATES PATENTS

| Number | Name | Date |
| --- | --- | --- |
| Re. 22,577 | Thomas | Dec. 12, 1944 |
| 932,843 | Bayrer | Aug. 31, 1909 |
| 1,132,746 | Sundh | Mar. 23, 1915 |
| 1,458,565 | Weston | June 12, 1923 |
| 1,561,549 | Kraft | Nov. 17, 1925 |
| 1,688,852 | Christie | Oct. 23, 1928 |
| 2,065,737 | Ramsey | Dec. 29, 1936 |
| 2,066,450 | Bascle et al. | Jan. 5, 1937 |
| 2,145,894 | Rusch | Feb. 7, 1939 |
| 2,282,395 | Corrigan | May 12, 1942 |
| 2,318,028 | Thomas | May 4, 1943 |
| 2,329,594 | Corrigan | Sept. 14, 1943 |
| 2,371,227 | Dodge | Mar. 13, 1945 |
| 2,377,350 | Marsh | June 5, 1945 |